United States Patent
Shah et al.

(10) Patent No.: US 11,176,138 B2
(45) Date of Patent: Nov. 16, 2021

(54) CACHING TECHNIQUES FOR QUERY RUNTIME STATE

(71) Applicant: salesforce.com, inc., San Francisco, CA (US)

(72) Inventors: Punit B. Shah, Castro Valley, CA (US); Douglas Doole, Livermore, CA (US); Rama K Korlapati, El Segundo, CA (US); Serge P. Rielau, Alamo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/800,837

(22) Filed: Feb. 25, 2020

(65) Prior Publication Data

US 2021/0263936 A1 Aug. 26, 2021

(51) Int. Cl.
*G06F 16/245* (2019.01)
*G06F 16/2453* (2019.01)

(52) U.S. Cl.
CPC .. *G06F 16/24549* (2019.01); *G06F 16/24539* (2019.01); *G06F 16/24544* (2019.01)

(58) Field of Classification Search
None
See application file for complete search history.

(56) References Cited

U.S. PATENT DOCUMENTS

| | | | |
|---|---|---|---|
| 5,600,831 A | 2/1997 | Levy et al. | |
| 6,341,281 B1 | 1/2002 | MacNicol et al. | |
| 7,089,356 B1 * | 8/2006 | Chen | G06F 16/24532 711/113 |
| 8,086,598 B1 | 12/2011 | Lamb et al. | |
| 2008/0109424 A1 * | 5/2008 | Day | G06F 16/2455 |
| 2011/0087642 A1 * | 4/2011 | Rajamani | G06F 16/907 707/704 |
| 2012/0059817 A1 * | 3/2012 | Burger | G06F 16/2455 707/718 |
| 2014/0365533 A1 * | 12/2014 | Debray | G06F 16/24549 707/803 |
| 2017/0091269 A1 * | 3/2017 | Zhu | G06F 16/24542 |
| 2020/0142990 A1 * | 5/2020 | Freedman | G06F 16/24547 |

* cited by examiner

*Primary Examiner* — Son T Hoang
(74) *Attorney, Agent, or Firm* — Kowert, Hood, Munyon, Rankin & Goetzel, P.C.

(57) ABSTRACT

Caching runtime plan data that is determined not to change for different invocations of a query plan. In some embodiments, a computing system accesses information that specifies a query plan generated for a first database query and generates a first runtime plan for the first database query based on the query plan. In some embodiments, the system caches information generated for the first runtime plan that is determined not to change for different invocations of the query plan. For example, transformation code may include separate functions for mutable and immutable state. In some embodiments, the system retrieves and uses the cached information to generate a second runtime plan for a second database query. Disclosed techniques may improve performance of query plan transformations that hit in the runtime plan cache.

13 Claims, 8 Drawing Sheets

| Index | NodeType | NodeOffset | NodeLeftChild | NodeRightChild |
|---|---|---|---|---|
| 1 | HashJoinState | 0x000 | 0x080 | 0x100 |
| 2 | TableScanState(t2) | 0x080 | null | null |
| 3 | HashState(t1) | 0x100 | 0x10F | null |
| 4 | TableScanState(t1) | 0x10F | null | null |

*Query interface*
*400*

```
run_query(char *queryString, query_plan){
   CacheMetaData *cb = CacheMetaData_init();
   if (cache_hit(cb, queryString, context)){
      for (every node n in cb){
         switch (node_type){
            case HashState:
               CachedHashState *chs = get_from_cache(cb, n)
               InitHash_Mutable(chs, cb);
            case TableScanState:
               ...
            case HashJoin:
               ...
         }
      }
   }
   else
   {
      for (every node n query_plan){
         switch (node_type){
            case HashState:
               SetupHash_Immutable(n, cb);
               InitHash_Mutable(chs, cb);
            case TableScanState:
               ...
            case HashJoinState:
               ...
         }
      }
   }
}
```

*Fig. 4*

*Immutable state  
capture function  
500*

```
// Example function called on cache miss to capture
// immutable state. Each node may have a different set of
// mutable and immutable state
CachedHashState *
SetupHash_Immutable(Hash *node, CacheMetaData *cb)
{
  HashState *hs = allocate_memory(HashState);

hs->node = node;
  hs->immutable_scalar1 = some_value1;
  hs->immutable_scalar2 = some_value2;
  // ...
  hs->immutable_scalarN = some_valueN;

CachedHashState *chs = copy_into_cache_node(cb, hs);

hs->immutable_pointer1 =
        allocate_memory_and_init_pointer(sometype1);

copy_into_cache_pointer(cb, chs, hs->immutable_pointer1);

return chs;
}
```

*Fig. 5*

*Mutable state initialization function 600*

```
CachedHashState *
InitHash_Mutable(CachedHashState *chs, CacheMetaData *cb)
{
  hs = get_hs_from_chs(chi);
  for (int i = 0; i < num_table; ++i)
  {
    acquire_lock(hs->table_list[i]);
    open_table(hs->table_list[i]);
  }
  allocate_memory(hs->hash_table_memory);
}
```

CACHING TECHNIQUES FOR QUERY RUNTIME STATE

BACKGROUND

Technical Field

Embodiments described herein relate to database technology and, in particular, to caching query runtime plan data.

Description of the Related Art

Database queries can often be complex. Often, a query optimizer module generates a query plan for a database query. For example, the query plan may be organized according to a tree structure with an operation indicated at each node. The query plan may be transformed into a runtime plan, which may be executed to actually perform the query. Matching queries may re-use the same query plan, but transformation of the query plan to an execution plan for each query may have substantial costs, e.g., for tree traversal, execution of code for query node to runtime node conversion, memory allocation/management, and state management.

BRIEF DESCRIPTION OF THE DRAWINGS

FIG. 4 is a diagram illustrating example query interface code that checks for runtime cache hits, according to some embodiments.

FIG. 5 is a diagram illustrating example program code that generates a runtime cache entry, according to some embodiments.

Figure 1:
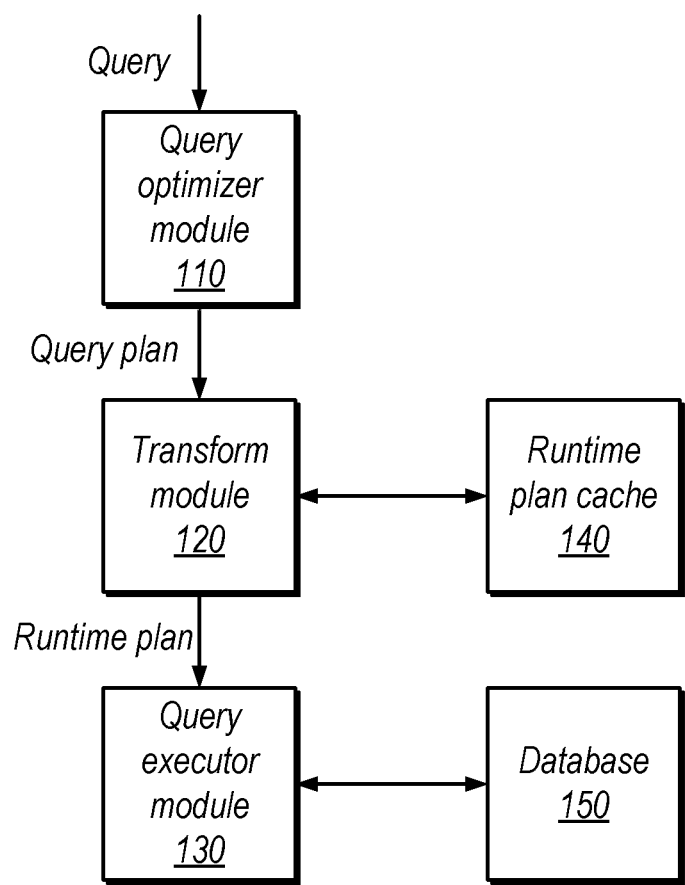
FIG. 1 is a block diagram illustrating an example system that includes a cache for runtime plan data, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "database module configured to access a data store" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

DETAILED DESCRIPTION

In various disclosed embodiments, a computing system uses a runtime plan cache to cache a portion of runtime state generated during transformation of a query plan to a runtime plan. For example, the system may cache immutable state that will not change for multiple invocations of the query plan, but may regenerate mutable state for each invocation. In various embodiments, the disclosed techniques may advantageously improve database performance, reduce use of database processing resources, reduce memory requirements, etc.

Example System with Runtime Cache

FIG. 1 is a block diagram illustrating a system that includes a runtime plan cache, according to some embodiments. In the illustrated embodiment, the system includes query optimizer module 110, transform module 120, query executor module 130, runtime plan cache 140, and database 150.

Query optimizer module 110, in some embodiments, is configured to receive a query and generate a query plan for the query. In some embodiments, query optimizer module 110 is configured to cache query plans in a query plan cache (not shown). In other embodiments, the system may cache both query plans and corresponding runtime state in the same cache (e.g., in runtime plan cache 140). Note that the term "query optimizer" is a commonly used term for modules configured to generate query plans to improve performance of database queries. The use of the term "optimizer" is not, however, intended to imply an optimum solution for a given query. Rather, different query optimizers may provide different query plans in various implementations.

Transform module 120, in some embodiments, is configured to receive the query plan and transform the query plan into a runtime plan (which may also be referred to as an execution plan). If there is a cache hit in runtime plan cache 140, transform module 120 may retrieve runtime state information for the runtime plan from the cache. Otherwise, transform module 120 may generate the entire runtime plan and cache corresponding runtime state in the runtime plan cache 140.

The query plan tree to runtime plan tree transformation may have substantial processing costs. For example, the transformation may include traversing the query plan tree in a preorder depth-first manner, which may be implemented using recursion. This may cause cache thrashing in processor caches which may result in stalls for superscalar processors, for example. The transformation may also include execution operation-node specific transformation code, which may be included in each operation node. The transformation may also include memory allocations, memory managements, and operations to build composite state (e.g., for input and output data types for each operation-node).

In some embodiments, transform module 120 is configured to tag cache entries in runtime plan cache 140. Transform module may generate the tag by performing a hash function on the query string. The tag may also include information associated with the context and search path (e.g., namespace information, schema information, etc.) to ensure that queries that hit in the cache actually match.

Query executor module 130, in some embodiments, is configured to execute received runtime plans to perform the query, including accessing database 150 which may include one or more database tables being queried.

Runtime plan cache 140, in some embodiments, includes multiple entries. Each entry may include metadata and a corresponding runtime operation-node snapshot, as discussed in further detail below.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Query Plan Tree and Runtime Plan Tree Overview

Figure 2:
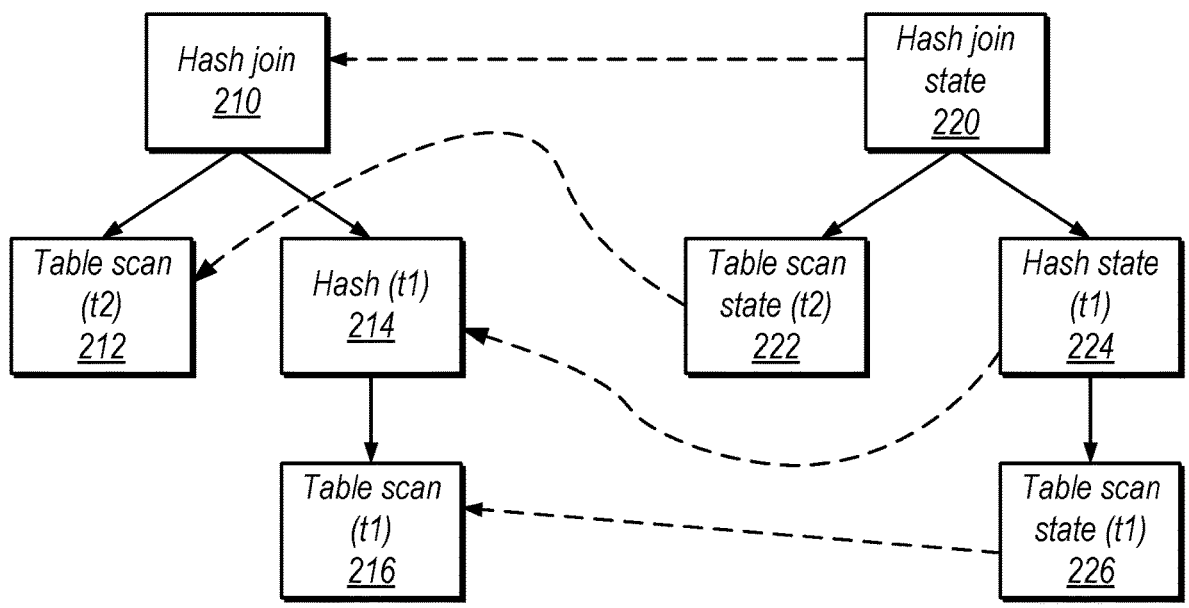
FIG. 2 is a block diagram illustrating an example query plan tree and runtime plan tree, according to some embodiments.

FIG. 2 is a block diagram illustrating example query plan and runtime plan trees, according to some embodiments. In the illustrated embodiment, the query plan tree includes operation-nodes 210-216 and the runtime plan tree includes nodes 220-226. In some embodiments, there is a one-to-one mapping between the runtime plan tree and the query plan tree. The dashed arrows, in the illustrated embodiment, indicate back-pointers to a corresponding query plan tree node while the solid arrows indicate tree parent-child relationships.

The labels t1 and t2, in some embodiments, refer to example database tables. For example, the illustrated plans may be generated for a query that accesses these two tables. The following pseudocode provides an example of creation of these two tables and a select operation that queries the tables.

create table t1 (c1 integer primary key, c2 char(10));
create table t2 (c1 integer primary key, c2 integer);
select * from t1 join t2 on t1.c1=t2.c2 where t1.c1+5>10;

In the illustrated example, the query plan includes the following operation-nodes: hash join 210, table scan 212 (of table t2), hash 214 (of table t1), and table scan 216 (of table t1). In the illustrated example, the runtime tree includes corresponding hash join state node 220, table scan state 222, hash state 224, and table scan state 226.

In some embodiments, an operation node may have up to N child nodes, although nodes with at most two child nodes are shown in the illustrated example. Each operation-node may include query-node-to-runtime-node conversion code that is executed during the transformation, which may generate runtime state. Further, each node may have one or more input data types and one or more output data types.

Example Linearization and Metadata

To cache runtime state information, in some embodiments, the system is configured to distinguish between mutable and immutable state and linearize the runtime tree for caching.

Figures 3A, 3B:
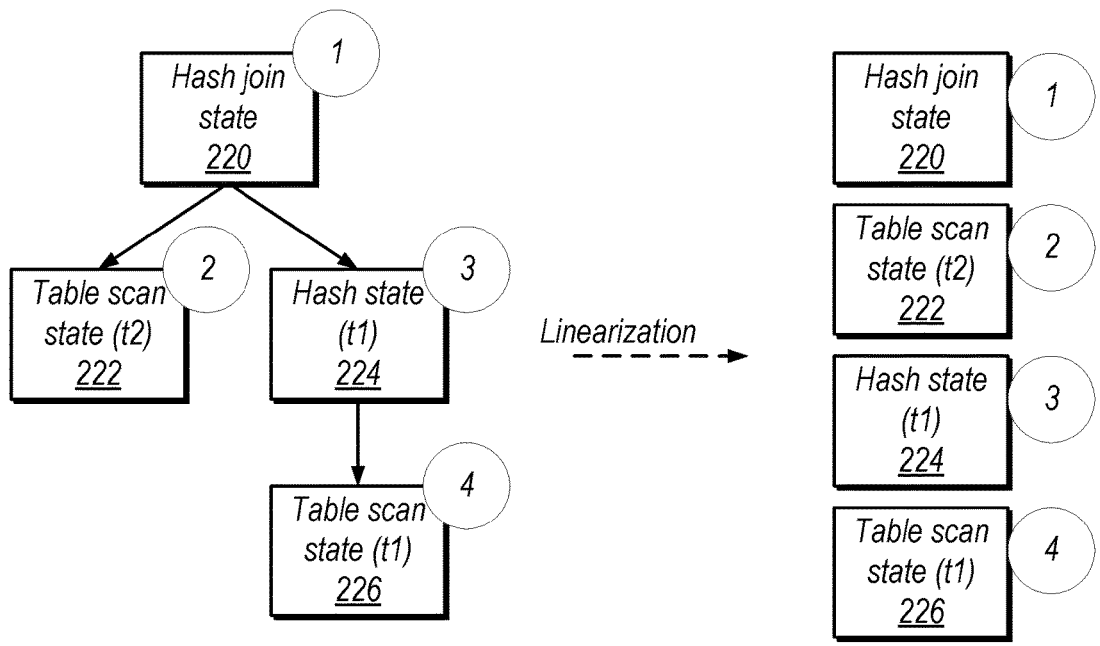
FIG. 3A is a diagram illustrating example linearization of a runtime plan tree, according to some embodiments.
FIG. 3B is a diagram illustrating example metadata, according to some embodiments.

FIG. 3A is a diagram illustrating example linearization of the runtime plan. In the illustrated example, the numbered circles represent a tree traversal order for a preorder depth-first traversal, with the following node sequence: 220, 222, 224, then 226. In the illustrated example, the linearization procedure packs the runtime tree operation-nodes in a relocatable linear memory block, which may facilitate caching.

FIG. 3B is a diagram illustrating example metadata generated by the computing system, according to some embodiments. The illustrated table may be referred to as a relocation table and captures information for each operation-node in the runtime tree. The system may cache the metadata shown in FIG. 3B along with the linearized state information.

In the illustrated example, the metadata includes the following information for each runtime operation-node: index, node type, node offset, left child, and right child. In some embodiments, there may be any number of child fields for each node, e.g., to support up to N child nodes. The index, in the illustrated embodiment, indicates the location of the node in the sequence. The node type indicates the type of operation node, and different types of nodes may execute different program instructions. The node offset indicates the location in memory of the node relative to the beginning of the linear block. This may allow the cache block to be relocatable from one process address space to another, e.g., by converting offsets into hard-pointers appropriate for the target process address space. The child fields indicate the location of any child nodes, also relative to the beginning of the linear block.

In some embodiments, the linearization procedure is performed recursively. For each node, it may linearize locations of child nodes as well as immutable state associated with the current node (e.g., pointers to other data structures, which may be separate from the tree structure), and may then move through the tree, performing similar operations at each node. If any immutable state hanging off of a tree node (e.g., via a pointer) has further immutable state hanging off, the procedure may recursively linearize that state as well.

For example, consider the following HashState data structure:

Struct HashState {
Node *left;
Node *right;
ImmutableData1*somePtr1;
ImmutableData2*somePtr2;
}

In some embodiments, the system would linearize somePtr1 and somePtr2 and reflect their locations in the metadata. For example, the metadata of FIG. 3B might include additional rows for ImmutableData1Offset and ImmutableData1Offset2 with offsets for each. Therefore, the metadata for a given node may include multiple entries that indicate linearized locations of respective data elements associated with the node.

Example Transformation Code that Utilizes Runtime State Caching

As discussed above, the system may distinguish between immutable state that does not change between invocations of a query plan and mutable state that may change between invocations. In some embodiments, the distinction between immutable and mutable state is accomplished by separating code that generates these respective types of state. Examples of immutable state include, without limitation: descriptions of tuple schemas, join methods, join orders, predicates (e.g., join predicates), expressions (e.g., an expression to change a value such as c1+5, max(c2), etc.), input record types, and output record types. Examples of mutable state may include actions that cannot be cached, such as acquiring a lock or allocating work memory. In some embodiments, the code is arranged so that the cached runtime snapshot includes only immutable state information. Therefore, on a cache hit, the system may run code for every operation-node to handle non-cached mutable state.

FIG. 4 is a diagram illustrating example program code 400 for a query interface, according to some embodiments. In the illustrated example, the query interface accesses cached runtime state on a cache hit and generates runtime state for caching on a cache miss. In the illustrated example, the run_query function receives a pointer to a query string and a query plan. The run_query function generates a runtime plan for the query by stepping through nodes of the query plan tree. First, the code sets up a data structure for storing runtime cache metadata (CacheMetadata) for the queryString, using a CacheMetaData_init( ) function.

The example code then calls a cache_hit function, passing the data structure, the queryString, and the context. This function may hash the queryString, for example, and determine whether the hashed value and context value match any entries in the runtime cache.

If there is a cache hit, the cache_hit function returns cached metadata in the CacheMetaData structure and the "for" loop goes through each runtime node specified in the metadata. In the illustrated examples of FIGS. 4-6, only code for the HashState type of node is shown for purposes of illustration, but similar techniques may be used for various different types of nodes.

When the switch operator determines that the node is a HashState node, the code creates a CachedHashState data structure to access the cached data for the node based on the metadata. The InitHash_Mutable function is then called to generate mutable state for the node. An example of this function is discussed in further detail below with reference to FIG. 6.

If there is not a cache hit, (e.g., if the operations in the "else" clause are performed) the code similarly goes through each node using a "for loop." In this situation, however, for the HashState type the code calls both SetupHash_Immutable and InitHash_Mutable functions. The first function may both generate and cache immutable state (an example of this function is discussed in detail below with reference to FIG. 5). Therefore, subsequent matching queries may have a cache hit when calling run_query.

FIG. 5 is a diagram illustrating example program code 500 that may be called in response a cache miss to capture immutable state for a node for caching, according to some embodiments. In the illustrated embodiment, the SetupHash_Immutable function receives operation-node and cache metadata operators and generates cached runtime state for a HashState node.

In the illustrated example, the function first allocates memory for an object to store the state information to be cached. It then stores generated immutable content (e.g., the illustrated scalar values) into the HashState object and copies the object into the cache using the copy_into_cache_node function. The "cb" object may track the number of entries in the metadata table and manage space (which may include re-allocating space in the case of an overflow). In some embodiments, performing the copying after the memory allocation may avoid memory allocation on a cache hit. In the illustrated example, the code also generates a pointer for the HashState and copies the pointer content into the cache.

After the SetupHash_Immutable function has executed, the get_from_cache( ) function discussed above with reference to FIG. 4 may be operable to retrieve the cached immutable state for the node.

Figure 6:
FIG. 6 is a diagram illustrating example program code that generates or regenerates mutable state for transformation of a query plan to a runtime plan, according to some embodiments.

FIG. 6 is a diagram illustrating example program code 600 that may be called to initialize mutable state regardless of whether there is a cache hit, according to some embodiments. In the illustrated embodiment, the InitHash_Mutable function receives cached state and cached metadata operators, acquires locks, and allocates memory. As discussed above, while the illustrated function is for a HashState node, mutable state initialization functions may perform various operations for various types of mutable state.

In various embodiments, the splitting of program code between code that generates immutable state and code that generates mutable state may advantageously allow performance improvements when immutable runtime state is already cached, e.g., by fetching from the cache and executing only the code that generates mutable runtime state for the runtime plan when a query that hits the cache is performed.

Example Method

Figure 7:
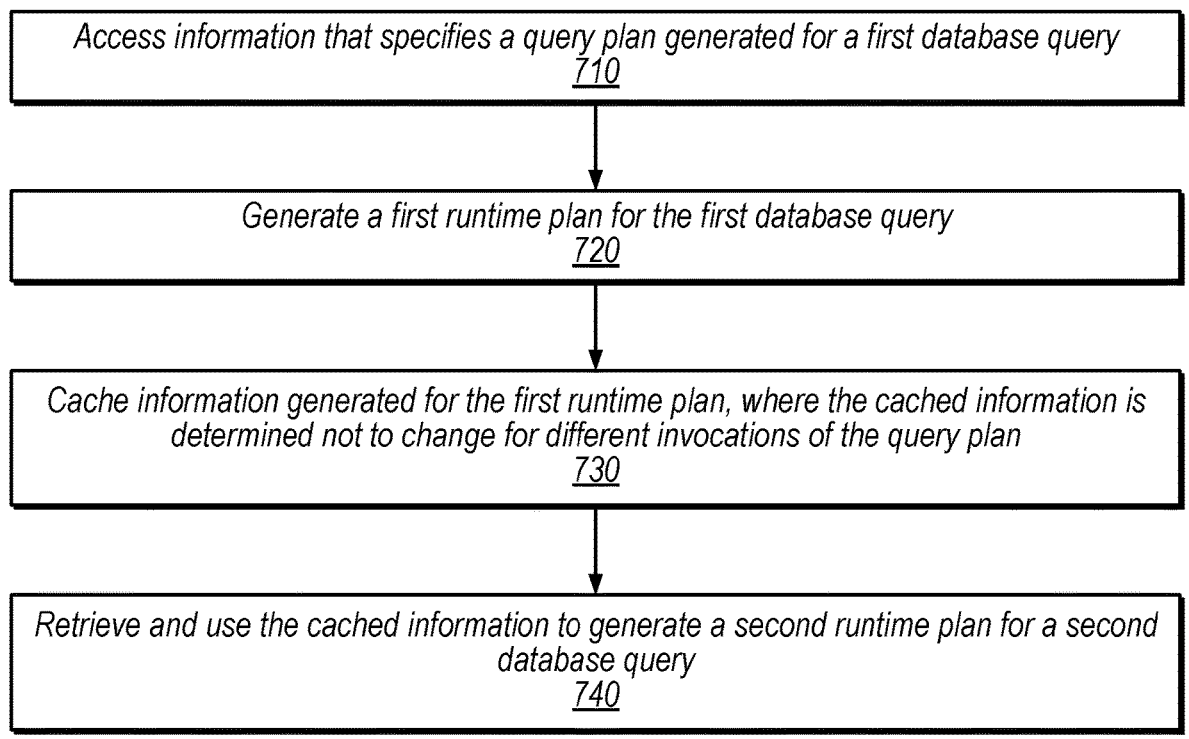
FIG. 7 is a flow diagram illustrating an example method for caching runtime state during transformation of a query plan, according to some embodiments.

FIG. 7 is a flow diagram illustrating a method for caching runtime state, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a computing system accesses information that specifies a query plan generated for a first database query. The query plan may have a tree structure, with an action indicated by each node. Tree nodes may each have a number of child nodes.

At 720, in the illustrated embodiment, the computing system generates a first runtime plan for the first database query. This may be referred to as transforming the query plan to a runtime plan. The runtime plan may have a tree structure corresponding to the query plan.

At 730, in the illustrated embodiment, the computing system caches information generated for the first runtime plan, where the cached information is determined not to change for different invocations of the query plan. In some embodiments, the cache information includes one of more of the following: a description of a tuple schema, a join method, a join order, one or more predicates, or one or more expressions. In some embodiments, the computing system does not cache other information that may change for different invocations of the query plan. For example, the system may not cache state information for acquiring a lock or allocating working memory.

In some embodiments, the cached information is determined not to change for different invocations of the query plan because it is generated by program code that generates immutable data, e.g., based on splitting of the program code into portions that generate immutable and mutable outputs as discussed above with reference to FIGS. 4-6.

In some embodiments, the system linearizes the tree structure of the runtime plan and generates metadata that describes the linearization (e.g., by describing locations of child nodes within the linearized block).

At 740, in the illustrated embodiment, the computing system retrieves and uses the cached information to generate a second runtime plan for a second database query. In some embodiments, this includes converting relative addresses in the metadata (e.g., the offsets in the table of FIG. 3B) to hard pointers. In some embodiments, the system detects a cache hit based on a cache tag that matches a hash of the second database query and matches database context information associated with the query. In some embodiments, the system may perform one or more transformation operations to generate runtime state information for the second runtime plan that may change for different invocations of the query plan. The computing system may then executed the second runtime plan. Note that generating the second runtime plan may advantageously use less computing resources and time than generating the first runtime plan because of the disclosed caching techniques.

Example Device

In some embodiments, any of various operations discussed herein may be performed by executing program instructions stored on a non-transitory computer readable medium. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Figure 8:
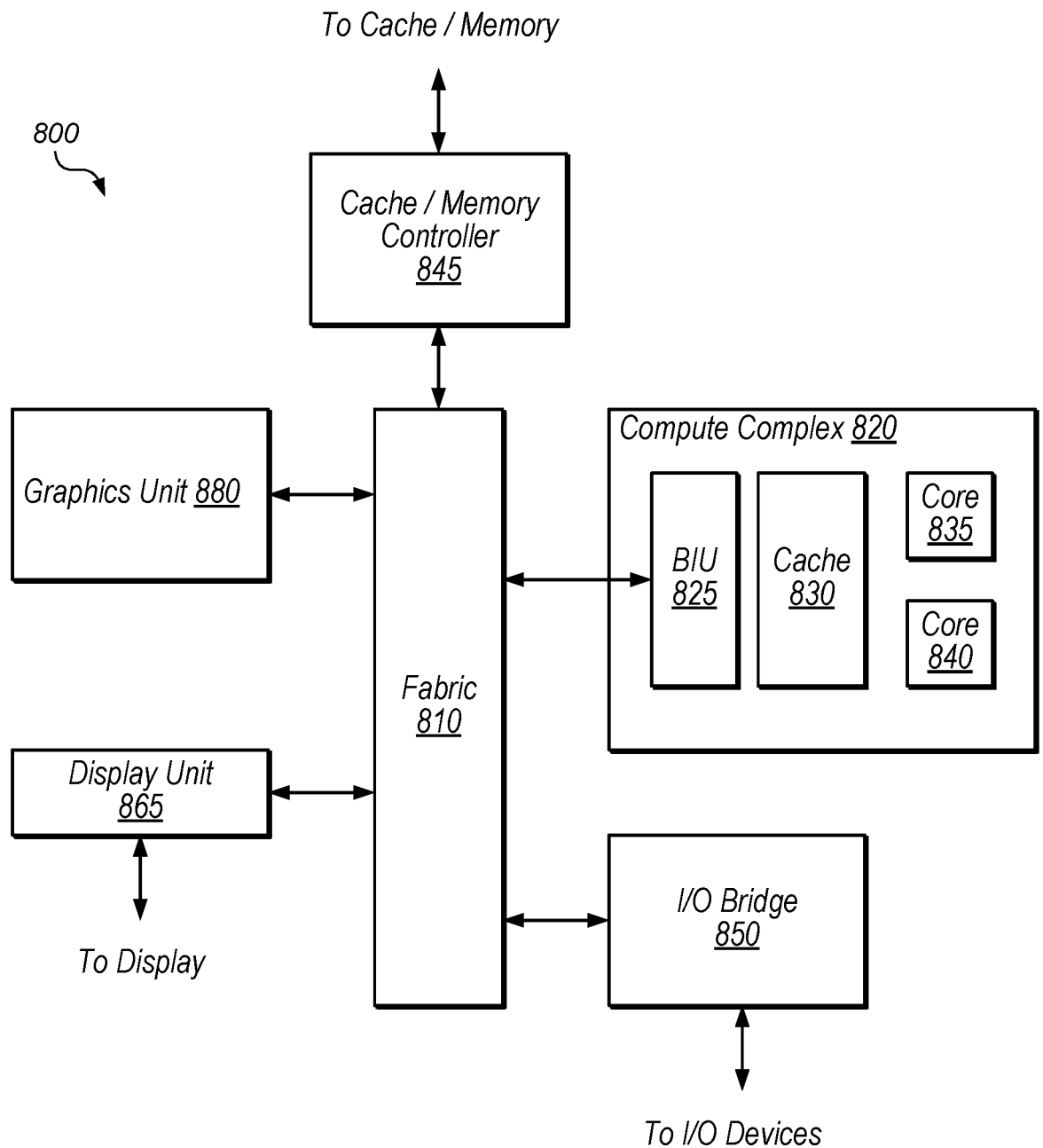
FIG. 8 is a block diagram illustrating an example computing system, according to some embodiments.

Referring now to FIG. 8, a block diagram illustrating an exemplary embodiment of a device 800 is shown. The illustrated processing elements may be used to implement all or a portion of the techniques discussed herein. In some embodiments, elements of device 800 may be included within a system on a chip. In the illustrated embodiment, device 800 includes fabric 810, compute complex 820, input/output (I/O) bridge 850, cache/memory controller 845, graphics unit 880, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 880 may be described as "coupled to" a memory through fabric 810 and cache/memory controller 845. In contrast, in the illustrated embodiment of FIG. 8, graphics unit 880 is "directly coupled" to fabric 810 because there are no intervening elements.

Graphics unit 880 may include one or more processors and/or one or more graphics processing units (GPU's). Graphics unit 880 may receive graphics-oriented instructions, such as OPENGL® or DIRECT3D® instructions, for example. Graphics unit 880 may execute specialized GPU instructions or perform other operations based on the received graphics-oriented instructions. Graphics unit 880 may generally be configured to process large blocks of data in parallel and may build images in a frame buffer for output to a display. Graphics unit 880 may include transform, lighting, triangle, and/or rendering engines in one or more graphics processing pipelines. Graphics unit 880 may output pixel information for display images.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by a computing system, information that specifies a query plan generated for a first database query;
    generating, by the computing system based on the query plan, a first runtime plan for the first database query, wherein:
        the query plan has a tree structure and the first runtime plan has a corresponding tree structure;
        two or more different nodes in the query plan tree structure specify respective operations of the query plan; and
        two or more different nodes of the first runtime plan specify respective state for a corresponding node in the tree structure of the query plan;
    linearizing information of the tree structure of the first runtime plan for caching, including:
        storing nodes of the first runtime plan at memory offsets according to a traversal of the tree structure of the first runtime plan; and
        generating metadata that indicates relative memory locations of multiple data elements associated with nodes of the tree structure of the first runtime plan;
    caching, by the computing system, the linearized information of the first runtime plan, wherein the cached information is determined not to change for different invocations of the query plan; and
    retrieving and using, by the computing system, the cached information to generate a second runtime plan for a second database query.

2. The method of claim 1, wherein the cached information includes one or more of:
    a description of a tuple schema;
    a join method;
    a join order;
    one or more predicates; or
    one or more expressions.

3. The method of claim 1, wherein the generating includes acquiring a lock and allocating working memory and wherein results of the acquiring and allocating are not cached and the results differ for the different invocations of the query plan.

4. The method of claim 1, wherein the retrieving the cached information includes converting relative addresses in the metadata to pointers.

5. The method of claim 1, wherein the retrieving is performing in response to a cache hit that is detected based on a hash of the second database query and database context information associated with the second database query.

6. The method of claim 1, further comprising:
performing one or more transformation operations to generate runtime state information for the second runtime plan that are allowed to differ for the different invocations of the query plan.

7. A non-transitory computer-readable medium having instructions stored thereon that are executable by a computing device to perform operations comprising:
accessing information that specifies a query plan generated for a first database query;
generating, based on the query plan, a first runtime plan for the first database query, wherein:
the query plan has a tree structure and the first runtime plan has a corresponding tree structure;
two or more different nodes in the query plan tree structure specify respective operations of the query plan; and
two or more different nodes of the first runtime plan specify respective state for a corresponding node in the tree structure of the query plan;
linearizing information of the tree structure of the first runtime plan for caching, including:
storing nodes of the first runtime plan at memory offsets according to a traversal of the tree structure of the first runtime plan; and
generating metadata that indicates relative memory locations of multiple data elements associated with nodes of the tree structure of the first runtime plan;
caching the linearized information of the first runtime plan, wherein the cached information is determined not to change for different invocations of the query plan; and
retrieving and using the cached information to generate a second runtime plan for a second database query.

8. The non-transitory computer-readable medium of claim 7, wherein the cached information includes one or more of:
a description of a tuple schema;
a join method;
a join order;
one or more predicates; or
one or more expressions.

9. The non-transitory computer-readable medium of claim 7, wherein the generating includes acquiring a lock and allocating working memory and wherein results of the acquiring and allocating are not cached and the results differ for the different invocations of the query plan.

10. The non-transitory computer-readable medium of claim 7, wherein the retrieving is performing in response to a cache hit that is detected based on a hash of the second database query and database context information associated with the second database query.

11. A system, comprising:
one or more processors configured to:
access information that specifies a query plan generated for a first database query;
generate, based on the query plan, a first runtime plan for the first database query, wherein:
the query plan has a tree structure and the first runtime plan has a corresponding tree structure;
two or more different nodes in the query plan tree structure specify respective operations of the query plan; and
two or more different nodes of the first runtime plan specify respective state for a corresponding node in the tree structure of the query plan;
linearize information of the tree structure of the first runtime plan for caching, including to:
store nodes of the first runtime plan at memory offsets according to a traversal of the tree structure of the first runtime plan; and
generate metadata that indicates relative memory locations of multiple data elements associated with nodes of the tree structure of the first runtime plan;
cache the linearized information of the first runtime plan, wherein the cached information is determined not to change for different invocations of the query plan; and
retrieve and using the cached information to generate a second runtime plan for a second database query.

12. The system of claim 11, wherein the cached information includes one or more of:
a description of a tuple schema;
a join method;
a join order;
one or more predicates; or
one or more expressions.

13. The system of claim 11, wherein the one or more processors are configured to retrieve the cached information in response to a cache hit that is detected based on a hash of the second database query and database context information associated with the second database query.

* * * * *